United States Patent
Nguyen et al.

(10) Patent No.: US 11,807,809 B2
(45) Date of Patent: Nov. 7, 2023

(54) DILUENT FOR SOLIDS-CONTROL FLUID IN A WELLBORE

(71) Applicant: Halliburton Energy Services, Inc., Houston, TX (US)

(72) Inventors: Philip D. Nguyen, Houston, TX (US); Shoy George, Thrissur (IN); Michael Wayne Sanders, Houston, TX (US); Josselyne Chano, Houston, TX (US); Sudarshana Mukherjee, Pune (IN)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 17/556,656

(22) Filed: Dec. 20, 2021

(65) Prior Publication Data

US 2023/0193114 A1 Jun. 22, 2023

(51) Int. Cl.
| | | |
|---|---|---|
| *E21B 33/138* | (2006.01) | |
| *C09K 8/575* | (2006.01) | |
| *C09K 8/50* | (2006.01) | |
| *C09K 8/508* | (2006.01) | |

(52) U.S. Cl.
CPC ............ *C09K 8/5755* (2013.01); *C09K 8/501* (2013.01); *C09K 8/5086* (2013.01); *E21B 33/138* (2013.01)

(58) Field of Classification Search
CPC .... C09K 8/5755; C09K 8/501; C09K 8/5086; E21B 33/138
See application file for complete search history.

(56) References Cited

U.S. PATENT DOCUMENTS

| | | |
|---|---|---|
| 3,404,735 A | 10/1968 | Young et al. |
| 5,806,593 A | 9/1998 | Surles |
| 7,104,325 B2 | 9/2006 | Nguyen et al. |
| 7,448,451 B2 | 11/2008 | Nguyen et al. |
| 2007/0187090 A1 | 8/2007 | Nguyen et al. |
| 2013/0292116 A1 | 11/2013 | Nguyen et al. |
| 2014/0144639 A1* | 5/2014 | Nguyen ............... E21B 43/267 166/300 |
| 2016/0108306 A1* | 4/2016 | Weaver .................. C09K 8/685 166/280.2 |
| 2018/0148635 A1 | 5/2018 | Shen et al. |

FOREIGN PATENT DOCUMENTS

| | | |
|---|---|---|
| EP | 1559867 A1 | 8/2005 |
| WO | 2015200011 A1 | 12/2015 |

OTHER PUBLICATIONS

PCT App. No. PCT/US2021/064413, "International Search Report and Written Opinion", dated Sep. 8, 2022, 13 pages.

* cited by examiner

*Primary Examiner* — Kumar R Bhushan
(74) *Attorney, Agent, or Firm* — Kilpatrick Townsend & Stockton LLP (57) ABSTRACT

A solids-control fluid for controlling flow of solids in a subterranean formation is disclosed herein. The solids-control fluid can include a diluent and a curable resin. The diluent can include a mutual solvent and an ethylene glycol. The curable resin can be dispersed within the diluent for controlling flow of solids in the subterranean formation.

10 Claims, 4 Drawing Sheets

DILUENT FOR SOLIDS-CONTROL FLUID IN A WELLBORE

TECHNICAL FIELD

The present disclosure relates generally to wellbore operations and, more particularly (although not necessarily exclusively), to diluents for solids-control fluids usable in a wellbore for controlling flow of solids.

BACKGROUND

A wellbore can be formed in a subterranean formation for extracting produced hydrocarbons or other suitable materials. One or more wellbore operations can be performed with respect to the wellbore (e.g., drilling to form the wellbore, extracting produced hydrocarbons, etc.). The wellbore operations can include or otherwise involve injecting fluid (e.g., water, proppant, mud, etc.) into the wellbore, into the subterranean formation, or a combination thereof. Injecting fluid into the wellbore or into the subterranean formation can cause solids (e.g., fine particulates, sand, etc.) in the subterranean formation to dislodge or to otherwise flow. The wellbore operations can include producing fluids from the subterranean formation and into the wellbore. Higher production rates, along with other detrimental processes, can cause the formation to break down and, if the production rates are sufficiently high, to allow the produced fluids to transport solids from the subterranean formation into the wellbore. Other control fluids that control flow of solids with respect to the subterranean formation may be unsafe or inefficient. For example, the other control fluids may include a low flashpoint that can cause unwanted combustion of, and damage caused by, the other control fluids at room temperature. Additionally, the other control fluids may require an excessive amount of resources (e.g., chemicals, etc.) to control the flow of solids with respect to the subterranean formation with longer interval lengths.

DETAILED DESCRIPTION

Certain aspects and examples of the present disclosure relate to controlling flow of solids in a subterranean formation using a solids-control fluid positionable in the subterranean formation via a wellbore formed in the subterranean formation. The solids can include fine particulates ("fines") of the subterranean formation, sand of the subterranean formation, other suitable solids, or a combination thereof. The solids-control fluid can include a diluent, a curable resin, a tackifying agent, other suitable components, or any combination thereof. The curable resin, the tackifying agent, or a combination thereof can be positioned (e.g., via the solids-control fluid) in the subterranean formation for controlling or mitigating the flow of the solids, for example, by adhering to the solids to increase a critical flow rate or to increase a critical velocity that may cause the solids to flow in the subterranean formation. The curable resin, the tackifying agent, or a combination thereof can control the flow of solids in the subterranean formation using other suitable techniques. The diluent can include a mutual solvent, an ethylene glycol, other suitable components, or a combination thereof. The mutual solvent can include ethylene glycol monobutyl ether, 2-methoxy ethanol, 2-ethoxy ethanol, 2-propoxy ethanol, other suitable mutual solvents, or any combination thereof. The ethylene glycol can include monoethylene glycol, propane 1,3 diol, butane 1,4 diol, propylene glycol, other suitable ethylene glycols, or any combination thereof.

Other fluids that may control solids in the wellbore may not be safe or economical. For example, the other fluids may include other diluents or other similar base fluids that may include a low flashpoint. The low flashpoint may cause the other fluids to ignite and cause damage to the wellbore, the wellsite, or personnel and may occur during transit to the wellbore or at the wellsite. Additionally, the other fluids may use a large amount of the other diluents (e.g., due to low solubility or other effectiveness measure of the other diluents) and may increase an amount of resources or time to perform tasks similar to tasks performable by a solids-control fluid having a diluent with a mutual solvent and an ethylene glycol. Additionally, the diluent including the mutual solvent and monoethylene glycol is more economical than the typical resin diluents used in the past.

A solids-control fluid can include a high-flashpoint diluent composition that can include a mutual solvent and an ethylene glycol. In some examples, the high-flashpoint diluent composition can include a flashpoint that is higher than the flashpoint of other diluents (e.g., isopropyl alcohol, furfural, etc.). The high-flashpoint diluent can be used as a carrier in diluting a curable resin to obtain a resin treatment composition with a desirable viscosity for formation consolidation applications in a subterranean formation. The consolidation applications can include sand production control, fines migration control, proppant consolidation or flowback control, other suitable consolidation applications, or a combination thereof. In some examples, the high-flashpoint diluent can also be used for diluting a tackifying agent to allow a diluted tackifying composition to be injected into formations surrounding a wellbore, or into formations adjacent to a propped fracture, to control migration of formation fines and particulates. In some examples, the high-flashpoint diluent, or any component or portion thereof (e.g., monoethylene glycol, etc.), may be used for hydrate suppression.

The flashpoint of the high-flashpoint diluent can provide a safer means for preparing and providing safer chemical compositions for field applications (e.g., solids control, fines control, etc.) involving the wellbore. The composition of the high-flashpoint diluent can be soluble in aqueous fluids for allowing the high-flashpoint diluent to be effectively extracted out of a curable resin composition, out of a tackifying agent composition, or out of other suitable compositions such that the curable resin or the tackifying agent, etc. remains on treated substrate surfaces to achieve desirable performance in the wellbore. Additionally, the high-flashpoint diluent can allow solids-control operations with respect to the wellbore to be performed at a lower cost of resources (e.g., materials, time, capital, etc.) compared to the cost of solids-control operations using other diluents (e.g., isopropyl alcohol, furfural, etc.). The high-flashpoint diluent may cause the solids-control fluid to exhibit similar or better performance than other solids-control compositions with other diluents. For example, and with respect to a curable resin, the diluent can allow a better yield of polymer or resin with respect to the solids (e.g., the diluent can cause an increased amount of polymer or resin to consolidate on a substrate surface compared to other diluents). In some examples, the high-flashpoint diluent can allow consolidation operations (or other suitable operations) to be performed over a longer time interval due to the reduced cost and increased safety associated with using the high-flashpoint diluent.

In some examples, a curable resin composition can include a furan-based (or other suitable type of) resin and a diluent. The diluent can include a mutual solvent, an ethylene glycol, and other suitable components. The mutual solvent can include ethylene glycol monobutyl ether, 2-methoxy ethanol, 2-ethoxy ethanol, 2-propoxy ethanol, other suitable mutual solvents, or a combination thereof. The ethylene glycol can include monoethylene glycol, propane 1,3 diol, butane 1,4 diol, propyllene glycol, and other suitable components. In some examples, the curable resin can additionally include an oil-wetting surfactant, a silane-coupling agent, or other suitable additives. In some examples, the diluent can be used as a base-fluid since the resin, the tackifying agent, or a combination thereof may include a viscosity above a threshold amount. Accordingly, the diluent may allow easier injection of the curable resin or the tackifying agent into wellbore.

The curable resin can be used to perform techniques relating to resin consolidation treatment for an interval of a wellbore. For example, the interval of the wellbore can be isolated. In some examples the interval of the wellbore can include an uncased interval with a formation surrounding the wellbore, a perforated interval with the perforations penetrating the casing and a short distance into wellbore wall, or a perforated interval connecting the wellbore with one or propped fractures penetrating some distance into the formation. The interval of the wellbore can include other suitable types of intervals. An aqueous pre-flush treatment fluid can be injected in the interval of the wellbore or in other suitable locations with respect to the wellbore. The pre-flush treatment fluid can include a brine, an oil-wetting surfactant, or other suitable components. The curable resin composition can be injected into the interval of the wellbore or in other suitable locations with respect to the wellbore. The curable resin composition can include the furan-based resin and the diluent, and the diluent can include the mutual solvent and the ethylene glycol. An aqueous spacer fluid can be injected into the interval of the wellbore or in other suitable locations with respect to the wellbore. The aqueous spacer fluid can include a brine, an oil-wetting surfactant, or other suitable components. An aqueous post-flush fluid can be injected into the interval of the wellbore or in other suitable locations with respect to the wellbore. The aqueous post-flush fluid can include a brine, an oil-wetting surfactant, a resin curing activator, and other suitable components. The resin curing activator may cause the curable resin composition to consolidate or otherwise activate for controlling solids in the interval of the wellbore.

In some examples (e.g., additionally or alternatively to the curable resin composition), a tackifying composition can be used to perform techniques relating to solids control in the wellbore (e.g., the interval of the wellbore). The tackifying composition can include a tackifying agent and the diluent that can include the mutual solvent and the ethylene glycol. In some examples, the tackifying composition can be used to provide techniques for a fines migration control treatment for the interval of the wellbore interval or for other suitable locations with respect to the wellbore. The interval of the wellbore can be isolated, and an aqueous pre-flush treatment fluid, which can include a brine, can be injected into the interval of the wellbore. The tackifying composition can be injected into the interval of the wellbore. The tackifying composition can include the tackifying agent and the diluent that may include the mutual solvent and the ethylene glycol. A post-flush treatment fluid that can include a brine can be injected into the interval of the wellbore. In some examples, the post-flush treatment fluid may cause the tackifying agent to consolidate or otherwise activate for controlling flow of fines in the interval of the wellbore.

The solids-control fluid, whether including the curable resin or the tackifying agent, or a combination thereof (e.g., pumping a solids-control fluid including a tackifying agent downhole, then pumping a solids-control fluid including a curable resin downhole), can improve a measure of turbidity of fluid (e.g., water) produced from the wellbore. For example, the below tables illustrate the improved turbidity. Table 1 includes turbidity (in units of nephelometric turbidity units (NTUs)) measurements associated with flow-back rates (in units of mL/min) without using a solids-control fluid. Table 2 includes the turbidity measurements associated with the flow-back rates with using the solids-control fluid. Table 2 illustrates that using the solids-control fluid can improve the turbidity of fluid (e.g., water) produced from the wellbore. An improved turbidity of produced fluid may indicate that solids of the subterranean formation are better controlled compared to produced fluids not using the solids-control fluid.

TABLE 1

| Flow-Back Rate (mL/min) | Turbidity (NTUs) (without solids-control fluid) |
|---|---|
| 10 | 6.54 |
| 20 | 24.1 |
| 40 | 233 |
| 80 | 984 |
| 160 | 3520 |
| 320 | 2810 |

TABLE 2

| Flow-Back Rate (mL/min) | Turbidity (NTUs) (with solids-control fluid) |
|---|---|
| 10 | 1.95 |
| 20 | 3.94 |
| 40 | 6.94 |
| 80 | 4.26 |
| 160 | 4.87 |
| 320 | 13.9 |

The above illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

Figure 1:
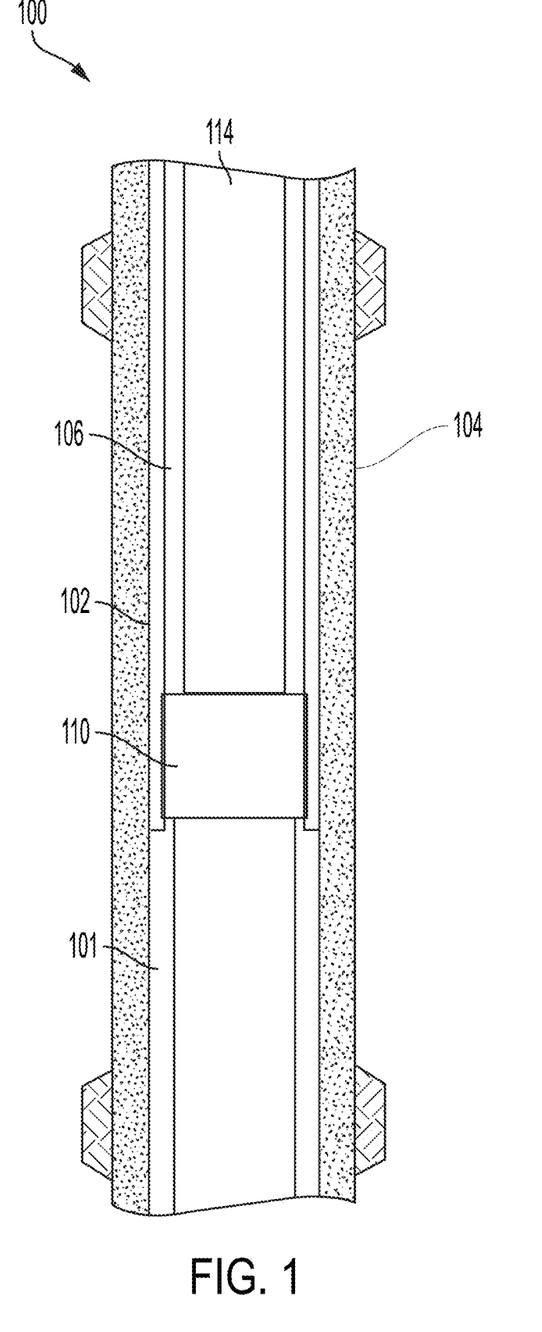
FIG. 1 is a schematic of a well system that can use a solids-control fluid in a subterranean formation to control flow of solids with respect to the subterranean formation according to one example of the present disclosure.

FIG. 1 is a schematic of a well system 100 that can use a solids-control fluid in a subterranean formation 104 to control flow of solids with respect to the subterranean formation 104 according to one example of the present disclosure. The well system 100 can include a wellbore 102 extending through various earth strata. The wellbore 102 can extend through a subterranean formation 104 that can include hydrocarbon material such as oil, gas, coal, or other suitable material. In some examples, a casing string 106 can extend from a well surface into the subterranean formation 104. The casing string 106 can provide a conduit through which fluids, such as solids-control fluids and production fluids produced from the subterranean formation 104, can travel to the well surface. The casing string 106 can be coupled to walls of the wellbore 102 via cement or other suitable coupling material. For example, a cement sheath can be positioned or formed between the casing string 106 and the walls of the wellbore 102 for coupling the casing string 106 to the wellbore 102. The casing string 106 can be coupled to the wellbore 102 using other suitable techniques. In some examples, the wellbore 102 may not include the casing string 106 (e.g., or the cement sheath), and, instead, a wall of the wellbore 102, or a portion thereof, may be or otherwise include the subterranean formation 104.

The well system 100 can include at least one well tool 110 that can be positioned in the wellbore 102. The well tool 110 can be coupled to a wireline 114, a slickline, or coiled tubing that can be deployed into the wellbore 102. The wireline 114, the slickline, or the coiled tube can be guided into the wellbore 102 using, for example, a guide or winch. In some examples, the wireline 114, the slickline, or the coiled tube can be unwound from around a reel to be deployed into the wellbore 102. In some examples, the well tool 110 can include a packer or other suitable well tool that can be used to isolate one or more intervals of the wellbore 102 such as interval 101. The well tool 110 can expand radially outward, actuate, or otherwise perform suitable tasks for isolating the interval 101 of the wellbore 102 from other portions of the wellbore 102.

The interval 101 of the wellbore can include a subset of the wellbore 102. A wall of the wellbore 102 in the interval 101 can include a casing string 106 having perforations (e.g., for hydraulic fracturing or other similar wellbore operations) for accessing the subterranean formation 104. In some examples, the wall of the wellbore 102 in the interval 101 can alternatively be or otherwise include the subterranean formation 104 (e.g., the interval 101 may not include a casing string 106 or other similar component positioned in the wellbore 102). The interval 101 can be isolated (e.g., using the well tool 110) for performing one or more wellbore operations. For example, the interval 101 can be isolated for performing stimulation operations, for injecting solids-control fluids into the subterranean formation 104 for controlling flow of solids, such as sand, fines, or other suitable solids, in the subterranean formation 104, or for performing other suitable wellbore operations.

In some examples, the well system 100 can be used to perform one or more wellbore operations. The operations can include stimulation or other suitable or similar wellbore operations that may interact with the subterranean formation 104. For example, proppant, aqueous fluid, or other suitable material can be injected into the subterranean formation 104 via the interval 101 of the wellbore 102. Injecting the proppant, the aqueous fluid, or other suitable into the subterranean formation 104 may allow an increased amount of hydrocarbon material to be accessible (e.g., compared to not using the proppant or aqueous fluid) to the well system 100. Additionally, injecting the proppant, the aqueous fluid, or other material into the subterranean formation 104 may cause solids, such as sand, fines, or the like, to loosen or to potentially migrate (e.g., into the wellbore 102). Migrating solids may negatively impact the wellbore operations, for example, by reducing a productiveness or an efficiency of the wellbore operations.

A solids-control fluid can be injected into the wellbore 102 for controlling the flow or migration of solids with respect to the wellbore 102. For example, the solids-control fluid, which may include a diluent and a curable resin or a tackifying agent, can be injected into the subterranean formation 104 via the interval 101 of the wellbore 102. The solids-control fluid can be activated while positioned in the subterranean formation 104 (or while positioned in other suitable locations with respect to the wellbore 102), and the activated solids-control fluid can control the flow or migration of solids in the well system 100. For example, the solids-control fluid may combine with or otherwise adhere to a group of solids in the subterranean formation 104. The solids may include fines (e.g., solids in the subterranean formation 104 and having a diameter below a threshold such as 40 microns or 0.016 inches), sand (e.g., solids having a diameter above the threshold or other suitable sand-type solids), or other suitable solids of the subterranean formation 104. By combining with or adhering to the solids, the solids-control fluid may adjust flow rates of the solids in the subterranean formation 104. For example, the solids-control fluid may mitigate an amount of solids that may detach or that may be produced from the subterranean formation 104.

Figure 2:
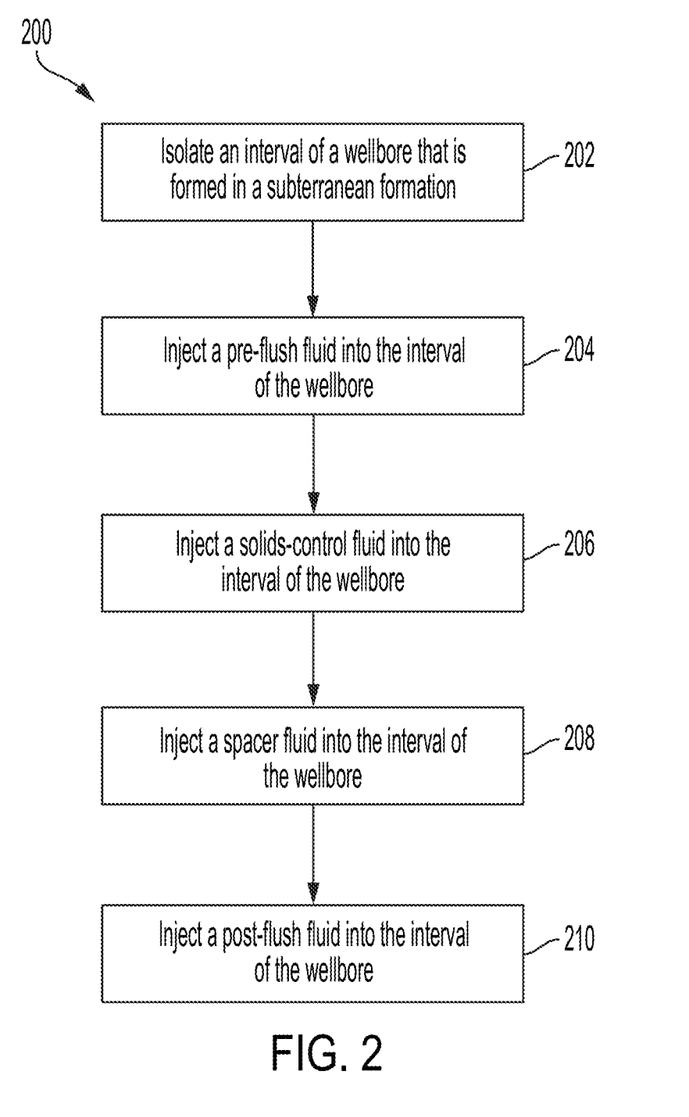
FIG. 2 is a flowchart of a process to control flow of solids in a subterranean formation using a solids-control fluid according to one example of the present disclosure.

FIG. 2 is a flowchart of a process 200 to control flow of solids in a subterranean formation using a solids-control fluid according to one example of the present disclosure. At block 202, an interval (e.g., the interval 101) of a wellbore 102 is isolated. The interval of the wellbore 102 may include a subset of the wellbore 102, and a wall of the wellbore 102 in the isolated interval may include the subterranean formation 104, the casing string 106 having perforations for accessing the subterranean formation 104, or other suitable material. In some examples, the interval of the wellbore 102 can be isolated using a packer or other suitable well tool for isolating a portion of the wellbore 102.

At block 204, a pre-flush fluid is injected into the interval of the wellbore 102. The pre-flush fluid can include a brine, or other suitable base-fluid, and a wetting agent. In some examples, the wetting agent can include an oil-wetting surfactant or other suitable wetting agents. The wetting agent can be injected into the subterranean formation 104 via the interval of the wellbore 102 and may prime or otherwise interact with solids in the subterranean formation 104 (or other suitable components of the wellbore 102) for enhancing a coating of subsequently injected fluids. For example, a curable resin may be subsequently injected into the subterranean formation via the interval of the wellbore 102, and a coating of the curable resin with respect to the solids of the subterranean formation 104 may be enhanced (compared to the curable resin injected into a wellbore that does not include a prior-injected wetting agent) due to the wetting agent.

At block 206, a solids-control fluid is injected into the interval of the wellbore 102. The solids-control fluid may include a diluent and a solids-control agent. The diluent can include a mutual solvent, an ethylene glycol, and other suitable components for the diluent. In some examples, the mutual solvent can include a combination of solvents that includes at least one solvent that is approximately completely soluble in an aqueous solution. The mutual solvent can include ethylene glycol monobutyl ether, 2-methoxy ethanol, 2-ethoxy ethanol, 2-propoxy ethanol, or other suitable mutual solvent or combination of mutual solvents. The ethylene glycol can include monoethylene glycol, propane 1,3 diol, butane 1,4 diol, propyllene glycol, or other suitable ethylene glycol. In some examples, the diluent can include a flashpoint that may be greater than 110° F. or 44° C. For example, the diluent can include a flashpoint of 160° F. or 71° C., 200° F. or 93° C., or larger. The flashpoint of the diluent may allow safer transport and handling of the diluent compared to other diluents (e.g., isopropyl alcohol, methanol, etc.) having low flashpoints (e.g., lower than 110° F. or 44° C.).

The solids-control agent can be positioned in the subterranean formation 104 for controlling a flow or a migration of solids (e.g., sand, fines, and the like) with respect to the wellbore 102. The solids-control agent can include a curable resin (e.g., a furan-based resin or other suitable type of resin), a tackifying agent, or other suitable solids-control agent. The curable resin can be used to control sand, fines, or a combination thereof in the subterranean formation 104. For example, a first concentration or ratio of the curable resin can be used to control sand in the subterranean formation 104, and a second concentration or ratio of the curable resin can be used to control flow of fines in the subterranean formation 104. The tackifying agent can be used to control migration of fines in the subterranean formation 104. For example, the tackifying agent may tack (e.g., adhere to) the fines into-place in the subterranean formation 104 for mitigating the migration of fines in the subterranean formation 104. The solids-control agent may combine with, adhere to, coat, or otherwise interact with solids of the subterranean formation 104 for preventing a critical flow or critical velocity (which may cause the solids to dislodge or be produced from the subterranean formation 104) from being achieved. In some examples, the solids-control agent, using the diluent, can additionally clean the wellbore 102 or the subterranean formation 104.

At block 208, an aqueous spacer fluid is injected into the interval of the wellbore 102. The spacer fluid can include brine, or other suitable base-fluid, a wetting agent (e.g., a surfactant), and other suitable components for a spacer fluid. The spacer fluid may be injected into the subterranean formation 104 or otherwise be positioned to provide a spacer function for the solids-control fluid. For example, the spacer fluid may be injected into the interval of the wellbore 102 for preventing or delaying contact between the solids-control fluid and a catalytic element that may cause the solids-control fluid to consolidate or otherwise activate. The spacer fluid can be injected into the interval of the wellbore 102 for performing other suitable operations or tasks with respect to the well system 100.

At block 210, a post-flush fluid is injected into the interval of the wellbore 102. The post-flush fluid can include a brine, or other suitable base-fluid, a wetting agent, a catalytic agent, other suitable components for the post-flush fluid, or any suitable combination thereof. The catalytic agent may include a curing agent such as a resin curing activator. In some examples, the catalytic agent may mix with or otherwise contact the solids-control fluid for activating the solids-control fluid. By activating, the solids-control fluid may consolidate or perform other suitable functions for controlling solids in the subterranean formation 104. For example, activating the solids-control fluid can involve causing the solids-control fluid to consolidate for preventing (or mitigating an amount of) the solids from reaching a critical flow. Additionally or alternatively, the solids-control fluid can be activated to control proppant flow-back in the wellbore 102. In some examples, upon activation of the solids-control fluid (or in other suitable situations), the diluent may be produced or otherwise extracted from the subterranean formation 104. The diluent may be produced, but the solids-control agent may remain activated and in the subterranean formation 104.

In some examples, more than one interval (e.g., a set of intervals) in the wellbore 102 can be isolated for controlling the flow of solids in the wellbore 102. The set of intervals can be isolated using a set of packers or other suitable devices for isolating the set of intervals in the wellbore 102. The aqueous post-flush fluid (e.g., injected into the wellbore 102 at the block 210) may be injected into the set of intervals subsequent to the injection of a set of repeating stages of the aqueous pre-flush fluid, the solids-control fluid, and aqueous spacer fluid. For example, an injection sequence can include the aqueous pre-flush fluid, the solids-control fluid, and then the aqueous spacer fluid. The injection sequence can be performed a predetermined amount of times (e.g., two times, three times, four times, etc.). In some examples, the predetermined amount of times may correspond to the amount of intervals in the set of intervals. Subsequent to performing the injection sequence the predetermined amount of times, the aqueous post-flush fluid can be injected into the wellbore 102 for activating the solids-control fluid.

Figure 3:
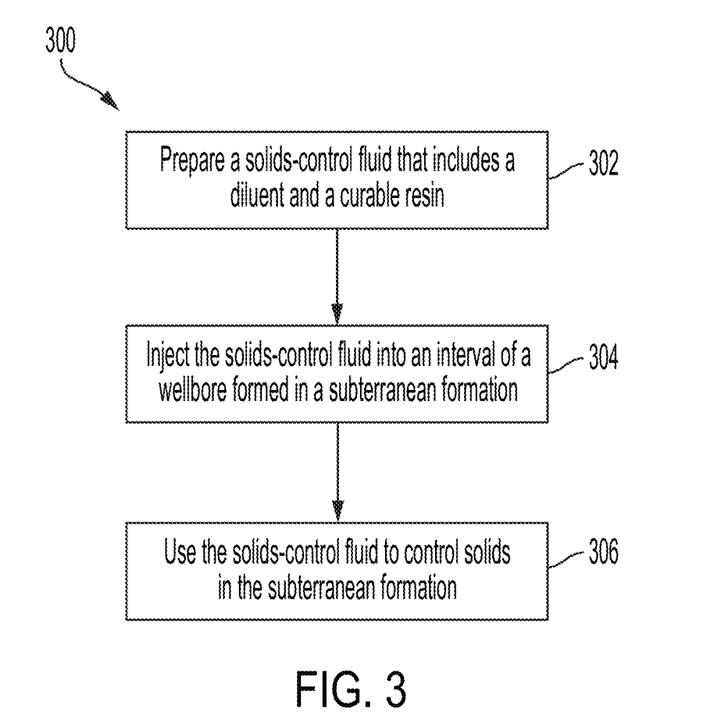
FIG. 3 is a flowchart of a process to control flow of solids using a solids-control fluid that includes a diluent and a curable resin according to one example of the present disclosure.

FIG. 3 is a flowchart of a process 300 to control flow of solids using a solids-control fluid that includes a diluent and a curable resin according to one example of the present disclosure. At block 302, a solids-control fluid is prepared. The solids-control fluid can include a diluent and a curable resin. The curable resin can be a furan-based resin or other suitable resin that can be used for controlling flow or migration of solids in the wellbore 102. The diluent can include a mutual solvent and an ethylene glycol. The mutual solvent can include ethylene glycol monobutyl ether, 2-methoxy ethanol, 2-ethoxy ethanol, 2-propoxy ethanol, or other suitable mutual solvent. The ethylene glycol can include monoethylene glycol, propane 1,3 diol, butane 1,4 diol, propyllene glycol, or other suitable ethylene glycol. In some examples, the solids-control fluid can additionally include a wetting agent, a coupling agent, or other suitable components for enhancing performance of the curable resin. For example, the wetting agent may improve (e.g., compared to a solids-control fluid without the wetting agent) spreading and penetration of the curable resin in the subterranean formation 104, and the coupling agent may improve (e.g., compared to a solids-control fluid without the coupling agent) adherence of the curable resin to solids of the subterranean formation 104.

The solids-control fluid can be batch-mixed (e.g., mixed prior to injecting into the wellbore 102), or the solids-control fluid can be mixed on the fly or otherwise while positioning the solids-control fluid in the wellbore 102. One or more ratios of components of the solids-control fluid can be observed while preparing the solids-control fluid. For example, with respect to the diluent, a ratio of the mutual solvent to the ethylene glycol may be 70:30. Other ratios of the mutual solvent to the ethylene glycol can include ratios greater than or about 65:35. In some examples, the ratios of the mutual solvent to the ethylene glycol can be from 65:35 to 75:25. Additionally, the ratio of the diluent to the curable resin for fines control can be 3:1, while the ratio of the diluent to the curable resin for sand control can be 1:1. Any other suitable ratio of the diluent to the curable resin can be used for controlling solids in the subterranean formation 104. In some examples, the solids-control fluid can be pre-packed with sand or other solids (which may be included in the subterranean formation 104) for increasing an effectiveness of the solids-control fluid.

At block 304, the solids-control fluid is injected into the wellbore 102. The prepared solids-control fluid can be injected into the subterranean formation 104 via interval 101 of the wellbore 102. In some examples, a pre-flush fluid including a wetting agent may be injected into the interval 101 of the wellbore 102 prior to injecting the solids-control fluid into the subterranean formation 104. The solids-control fluid may spread or otherwise penetrate the subterranean formation 104 and may adhere to solids (e.g., sand or fines) in the subterranean formation 104.

At block 306, the solids-control fluid is used to control solids in the subterranean formation 104. In some examples, the solids-control fluid having a first concentration of, or ratio involving, the curable resin can control sand in the subterranean formation 104, and the solids-control fluid having a second concentration of, or ratio involving, the curable resin can control fines in the subterranean formation 104. A post-flush fluid having a catalytic agent can be injected into the subterranean formation 104. The solids-control fluid can contact the catalytic agent, and the catalytic agent may cause the solids-control fluid to activate. In response to the solids-control fluid activating, the curable resin may consolidate or otherwise activate to control the solids in the subterranean formation 104, and the diluent may be produced or otherwise extracted from the subterranean formation 104. The diluent may be produced, but the activated curable resin may be retained in the subterranean formation 104 for controlling the solids.

Figure 4:
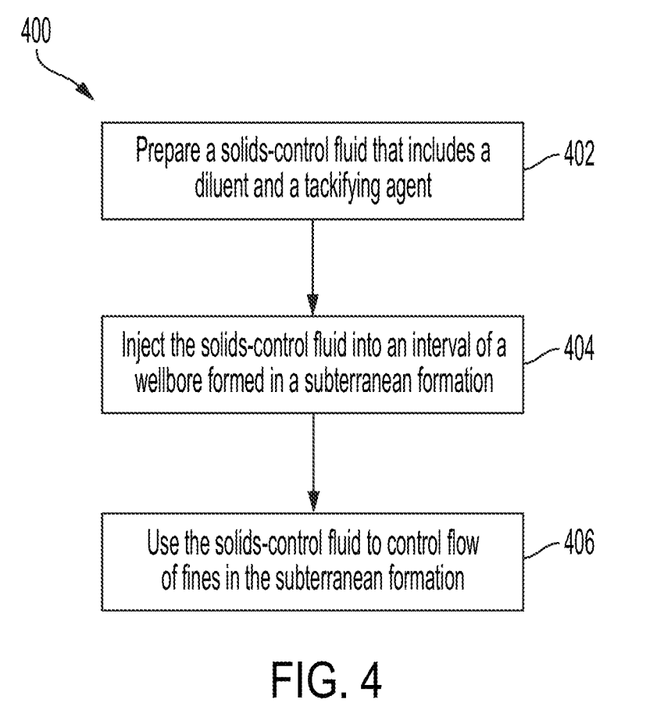
FIG. 4 is a flowchart of a process to control flow of solids using a solids-control fluid that includes a diluent and a tackifying agent according to one example of the present disclosure.

FIG. 4 is a flowchart of a process 400 to control flow of solids using a solids-control fluid that includes a diluent and a tackifying agent according to one example of the present disclosure. At block 402, a solids-control fluid is prepared. The solids-control fluid can include a diluent and a tackifying agent. The tackifying agent can be used for controlling flow or migration of fines in the subterranean formation 104 or otherwise with respect to the wellbore 102. The diluent can include a mutual solvent and an ethylene glycol. The mutual solvent can include ethylene glycol monobutyl ether, 2-methoxy ethanol, 2-ethoxy ethanol, 2-propoxy ethanol, or other suitable mutual solvent. The ethylene glycol can include monoethylene glycol, propane 1,3 diol, butane 1,4 diol, propyllene glycol, or other suitable ethylene glycol. The solids-control fluid can be batch-mixed (e.g., mixed prior to injecting into the wellbore 102), or the solids-control fluid can be mixed on the fly or otherwise while positioning the solids-control fluid in the wellbore 102. In some examples, the solids-control fluid can be pre-packed with sand or other solids (which may be included in the subterranean formation 104) for increasing an effectiveness of the solids-control fluid.

At block 404, the solids-control fluid is injected into the wellbore 102. The prepared solids-control fluid can be injected into the subterranean formation 104 via interval 101 of the wellbore 102. In some examples, a pre-flush fluid may be injected (e.g., for cleaning the wellbore 102 or for other suitable purposes) into the interval 101 of the wellbore 102 prior to injecting the solids-control fluid into the subterranean formation 104. The solids-control fluid may spread or otherwise penetrate the subterranean formation 104 and may adhere to fines in the subterranean formation 104.

At block 406, the solids-control fluid is used to control fines in the subterranean formation 104. In some examples, the solids-control fluid having the tackifying agent can control fines in the subterranean formation 104. The tackifying agent can tack or otherwise adhere to the fines for controlling the fines of the subterranean formation 104. In response to the solids-control fluid adhering to the fines, the diluent may be produced or otherwise extracted from the subterranean formation 104. The diluent may be produced, but the tackifying agent may be retained in the subterranean formation 104 for controlling the fines.

In some aspects, solids-control fluids and methods for solids-control fluids including diluents for controlling flow of solids in a subterranean formation are provided according to one or more of the following examples.

As used below, any reference to a series of examples is to be understood as a reference to each of those examples disjunctively (e.g., "Examples 1-4" is to be understood as "Examples 1, 2, 3, or 4").

Example 1 is a method comprising: isolating an interval of a wellbore, the wellbore formed in a subterranean formation; injecting an aqueous pre-flush fluid into the interval of the wellbore for preparing the interval of the wellbore for a solids-control fluid; injecting the solids-control fluid into the interval of the wellbore, the solids-control fluid comprising a solids-control agent and a diluent that comprises: a mutual solvent, and an ethylene glycol; injecting an aqueous spacer fluid into the interval of the wellbore for preventing the solids-control fluid from consolidating in the wellbore; and injecting an aqueous post-flush fluid that includes a solids-control-fluid activator into the interval of the wellbore for causing the solids-control fluid to consolidate in the subterranean formation.

Example 2 is the method of example 1, wherein the solids-control agent includes a curable resin, wherein the curable resin includes a furan-based curable resin, and wherein injecting the aqueous post-flush fluid includes injecting the aqueous post-flush fluid for activating the curable resin.

Example 3 is the method of any of examples 1-2, wherein injecting the solids-control fluid into the interval of the wellbore includes injecting the solids-control fluid, having a first ratio of the diluent to the curable resin, into the interval of the wellbore for controlling sand in the subterranean formation, and wherein injecting the solids-control fluid into the interval of the wellbore includes injecting the solids-control fluid, having a second ratio of the diluent to the curable resin, into the interval of the wellbore for controlling fines in the subterranean formation.

Example 4 is the method of example 1, wherein the solids-control agent includes a tackifying agent, and wherein injecting the solids-control fluid into the interval of the wellbore includes injecting the tackifying agent into the interval of the wellbore for adhering to fines in the subterranean formation.

Example 5 is the method of example 1, wherein the aqueous pre-flush fluid includes a brine and a wetting agent, and wherein the wetting agent is a surfactant, wherein the aqueous post-flush fluid includes a brine and the wetting agent, wherein the solids-control-fluid activator is a catalytic agent, and wherein injecting the aqueous post-flush fluid into the interval of the wellbore includes exposing the solids-control agent to the catalytic agent.

Example 6 is the method of example 1, wherein injecting the aqueous post-flush fluid into the interval of the wellbore includes extracting the diluent from the subterranean formation while retaining the solids-control agent in the subterranean formation.

Example 7 is the method of example 1, wherein at least one component of the diluent is soluble in an aqueous solution, and wherein a flashpoint of the diluent is greater than or about 110° F.

Example 8 is the method of example 1, wherein a ratio of the mutual solvent to the ethylene glycol is from 65:35 to 75:25.

Example 9 is the method of example 1, wherein the solids-control agent is a curable resin, and wherein the solids-control fluid includes: a coupling agent for increasing an adherence of the curable resin to solids in the subterranean formation; and a wetting agent for increasing a spread and a penetration of the curable resin in the subterranean formation.

Example 10 is a solids-control fluid comprising: a diluent comprising: a mutual solvent, and an ethylene glycol; and a curable resin dispersed within the diluent for controlling flow of solids in a subterranean formation.

Example 11 is the solids-control fluid of example 10, wherein the curable resin includes a furan-based curable resin, wherein the curable resin is activatable by a catalytic agent, and wherein the diluent is removable from the solids-control fluid subsequent to activating the curable resin via the catalytic agent.

Example 12 is the solids-control fluid of example 10, wherein the solids-control fluid having a first ratio of the diluent to the curable resin is usable to control flow of sand in the subterranean formation, and wherein the solids-control fluid having a second ratio of the diluent to the curable resin is usable to control flow of fines in the subterranean formation.

Example 13 is the solids-control fluid of any of examples 10 and 12, wherein the first ratio of the diluent to the curable resin is about 1:1, and wherein the second ratio of the diluent to the curable resin is about 3:1.

Example 14 is the solids-control fluid of example 10, wherein at least one component of the diluent is soluble in an aqueous solution, and wherein a flashpoint of the diluent is greater than or about 110° F.

Example 15 is the solids-control fluid of example 10, further comprising a tackifying agent, wherein the curable resin is dispersed within the diluent for controlling flow of sand in the subterranean formation, and wherein the tackifying agent is dispersed within the diluent for controlling flow of fines in the subterranean formation.

Example 16 is the solids-control fluid of example 10, wherein a ratio of the mutual solvent to the ethylene glycol is from 65:35 to 75:25.

Example 17 is the solids-control fluid of example 10, further comprising: a coupling agent for increasing an adherence of the curable resin to the solids in the subterranean formation; and a wetting agent for increasing a spread and a penetration of the curable resin in the subterranean formation.

Example 18 is a solids-control fluid comprising: a diluent comprising: a mutual solvent, and an ethylene glycol; and a tackifying agent dispersed within the diluent for controlling flow of solids in a subterranean formation.

Example 19 is the solids-control fluid of example 18, wherein at least one component of the diluent is soluble in an aqueous solution, wherein a flashpoint of the diluent is greater than or about 110° F., and wherein a ratio of the mutual solvent to the ethylene glycol is from 65:35 to 75:25.

Example 20 is the solids-control fluid of example 18, wherein the diluent is removable from the solids-control fluid subsequent to injecting the solids-control fluid into the subterranean formation, and wherein the tackifying agent is retainable in the subterranean formation subsequent to removing the diluent from the subterranean formation.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A solids-control fluid comprising:
   a diluent comprising:
      a mutual solvent, and
      an ethylene glycol; and
   a curable resin dispersed within the diluent for controlling flow of solids in a subterranean formation, wherein the solids-control fluid having a first ratio of the diluent to the curable resin is usable to control flow of a first type of solid in the subterranean formation, and wherein the solids-control fluid having a second ratio of the diluent to the curable resin is usable to control flow of a second type of solid in the subterranean formation.

2. The solids-control fluid of claim 1, wherein the curable resin includes a furan-based curable resin, wherein the curable resin is activatable by a catalytic agent, and wherein the diluent is removable from the solids-control fluid subsequent to activating the curable resin via the catalytic agent.

3. The solids-control fluid of claim 1, wherein the first type of solid comprises sand, and wherein the second type of solid comprises fines.

4. The solids-control fluid of claim 1, wherein the first ratio of the diluent to the curable resin is about 1:1, and wherein the second ratio of the diluent to the curable resin is about 3:1.

5. The solids-control fluid of claim 1, wherein at least one component of the diluent is soluble in an aqueous solution, and wherein a flashpoint of the diluent is greater than or about 110° F.

6. The solids-control fluid of claim 1, further comprising a tackifying agent, wherein the curable resin is dispersed within the diluent for controlling flow of sand in the subterranean formation, and wherein the tackifying agent is dispersed within the diluent for controlling flow of fines in the subterranean formation.

7. The solids-control fluid of claim 1, further comprising:
   a coupling agent for increasing an adherence of the curable resin to the solids in the subterranean formation; and
   a wetting agent for increasing a spread and a penetration of the curable resin in the subterranean formation.

8. A solids-control fluid comprising:
   a diluent comprising:
      a mutual solvent, and
      an ethylene glycol; and
   a tackifying agent dispersed within the diluent for controlling flow of solids in a subterranean formation, wherein the solids-control fluid having a first ratio of the diluent to a curable resin is usable to control flow of a first type of solid in the subterranean formation, and wherein the solids-control fluid having a second ratio of the diluent to the curable resin is usable to control flow of a second type of solid in the subterranean formation.

9. The solids-control fluid of claim 8, wherein at least one component of the diluent is soluble in an aqueous solution, and wherein a flashpoint of the diluent is greater than or about 110° F.

10. The solids-control fluid of claim 8, wherein the diluent is removable from the solids-control fluid subsequent to injecting the solids-control fluid into the subterranean formation, and wherein the tackifying agent is retainable in the subterranean formation subsequent to removing the diluent from the subterranean formation.

\* \* \* \* \*